United States Patent [19]
Heckenlaible

[11] 3,722,910
[45] Mar. 27, 1973

[54] HOOK UNIT FOR PICKUP TRUCKS

[76] Inventor: Harry R. Heckenlaible, 2086 Webb St., Stockton, Calif. 95205

[22] Filed: Apr. 21, 1971

[21] Appl. No.: 135,884

[52] U.S. Cl. ............................................280/179 R
[51] Int. Cl. ...............................................B60p 7/00
[58] Field of Search.......280/179 R, 179 A; 105/367; 248/361 R, 214, 298

[56] References Cited

UNITED STATES PATENTS

| | | | |
|---|---|---|---|
| 2,688,289 | 9/1954 | Sterling | 105/369 |
| 1,807,356 | 5/1931 | Vance | 248/298 |
| 2,859,710 | 11/1958 | Elsner | 248/298 |

*Primary Examiner*—Benjamin Hersh
*Assistant Examiner*—Robert R. Song
*Attorney*—Percy S. Webster and Robert B. Webster

[57] ABSTRACT

A rope hook unit removably mounted on a pickup truck or the like; the truck having, in combination with the hook unit, a horizontal, outwardly opening, supporting channel permanently secured thereon, and the hook unit (of which there are several in practice) being wedgingly engaged in the channel for use but manually quick-detachable from said channel for storage when not in use. Additionally, the hook unit is fitted with a manually disengageable locking dog which prevents accidental detachment from the channel of said hook unit when the latter is in use.

4 Claims, 6 Drawing Figures

Patented March 27, 1973  3,722,910

INVENTOR
HARRY R. HECKENLAIBLE
BY Webster & Webster
ATTORNEYS

INVENTOR
HARRY R. HECKENLAIBLE
BY Webster & Webster
ATTORNEYS

HOOK UNIT FOR PICKUP TRUCKS

BACKGROUND OF THE INVENTION

Pickup trucks, and similar vehicles, are conventionally fitted on the sides with permanently secured, exposed, downwardly opening, rope hooks, and which—when not in use—tend to catch on a person's clothing or at times to cause injury to a person upon contact, bodily, with such hooks. The present invention was conceived in seeking a solution to such problems.

SUMMARY OF THE INVENTION

The present invention provides, as an important object, a rope hook unit removably mounted on a pickup truck or the like; the truck having, in combination with the hook unit, a horizontal, outwardly opening, supporting channel permanently secured thereon, and the hook unit (of which there are several in practice) being wedgingly engaged in the channel for use but manually quick-detachable from said channel for storage when not in use.

The present invention provides, as another important object, a removable hook unit and supporting channel combination, as in the preceding paragraph, in which the channel is shallow, relatively wide, and has upper and lower lips defining facing longitudinal grooves; the hook unit including an attachment plate—having a hook fixed on and extending outwardly therefrom—disposed in the channel, and said attachment plate being formed and dimensioned so that—in one rotative position—the plate is wedgingly engaged in and spans between said grooves, and—in another rotative position—is free of the grooves and removable from the channel by passage between said lips. The hook opens downwardly for use when the hook unit is in said one position.

The present invention provides, as an additional important object, a removable hook unit and supporting channel combination, as above, in which the hook unit is fitted with a manually disengageable locking dog which engages in the channel and prevents accidental detachment therefrom of the hook unit when the latter is in use.

The present invention provides, as a further object, a hook unit for pickup trucks which is designed for ease and economy of manufacture.

The present invention provides, as a still further object, a practical, reliable, and durable hook unit for pickup trucks, and one which is exceedingly effective for the purpose for which it is designed.

DESCRIPTION OF THE PREFERRED EMBODIMENT

Figure 1:
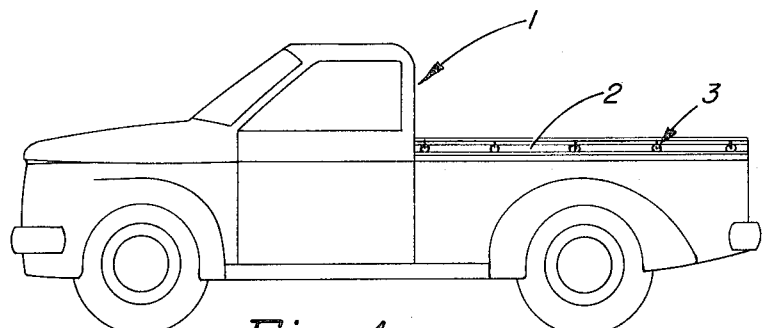
FIG. 1 is a diagrammatic side view of a pickup truck fitted with a plurality of the hook units.

Referring now more particularly to the drawings and to the characters of reference marked thereon, the present invention is shown as applied to a pickup truck 1, and includes—on each side thereof—a permanently affixed, longitudinally extending, laterally outwardly opening supporting channel 2 which is shallow but relatively wide. Each channel 2 receives and supports, at selective points in the length thereof, a plurality of rope hook units—each indicated generally at 3; such hook units 3 being firmly but removably secured in place in the channel 2 in the manner as will hereinafter appear. Thus, not only can the hook units 3 be secured—for use—at selected points on the supporting channel 2, but such hook units can—when not in use—be removed from the channel and elsewhere stored in the truck.

The form and dimensions of each hook unit 3, and the related channel 2, make it possible to accomplish ready manual attachment of the hook unit 3 to, or quick-detachment of said hook unit from, the channel 2; the particular structure of such parts, and the manner of their cooperation, being as follows:

The channel 2 includes upper and lower longitudinal lips 4 which define facing, V-shaped grooves 5, while the hook unit comprises an attachment plate 6 which—when the hook unit is in its position of use—is disposed in the channel 2 with upper and lower edges 7 and 8, respectively, wedgingly engaged in corresponding grooves; said plate having a hook 9 fixed on the outer face thereof by means of an integral, inwardly offset neck 10 which merges with a flat pad 11 welded to such plate. The hook 9 opens downwardly when the hook unit is in its position of use.

While the straight edges 7 and 8, of the wedged-in-place attachment plate 6, preclude rotation—by manipulation of hook 9—of such plate in a counter-clockwise direction, said plate can be part-circle rotated in a clockwise direction; this by reason of opposed corners 12 and 13 being rounded as shown. The purpose of such part-circle, clockwise rotation will later appear.

Figure 2:
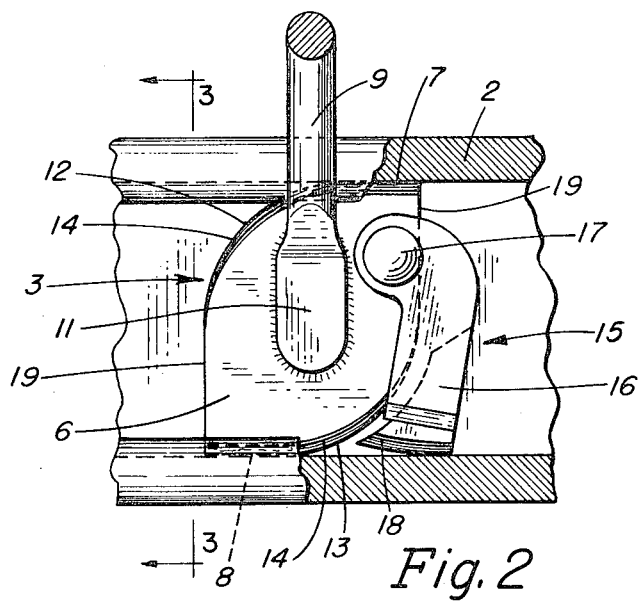
FIG. 2 is an enlarged elevation, partly broken away, of one hook unit in position for use.
Figure 3:
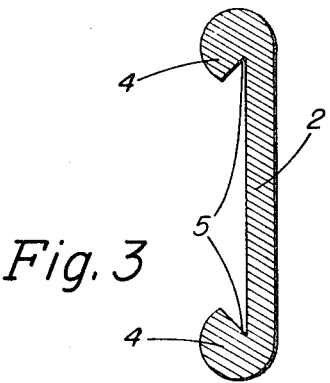
FIG. 3 is a vertical transverse section on line 3—3 of FIG. 2.
Figure 4:
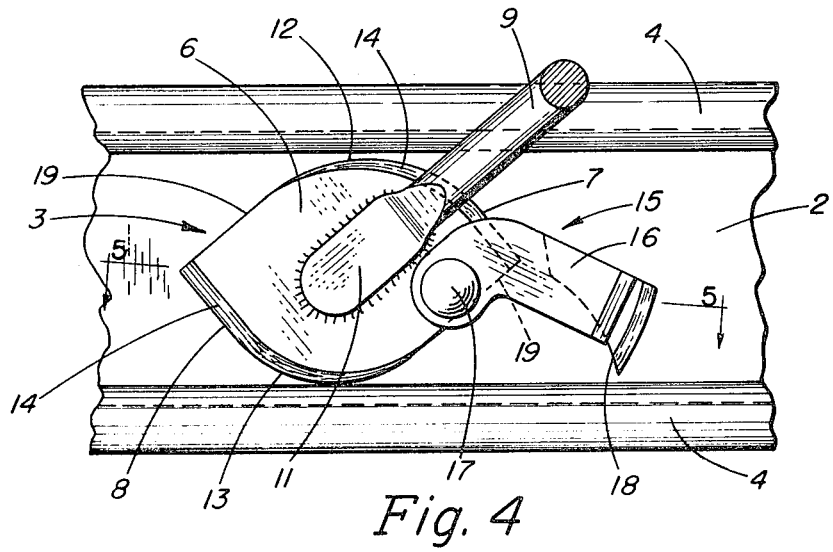
FIG. 4 is a view similar to FIG. 2, but shows the hook unit released and ready for removal from the supporting channel.
Figure 5:
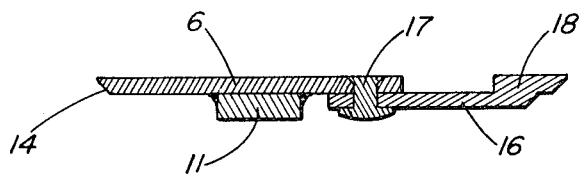
FIG. 5 is a sectional plan view taken on line 5—5 of FIG. 4.
Figure 6:
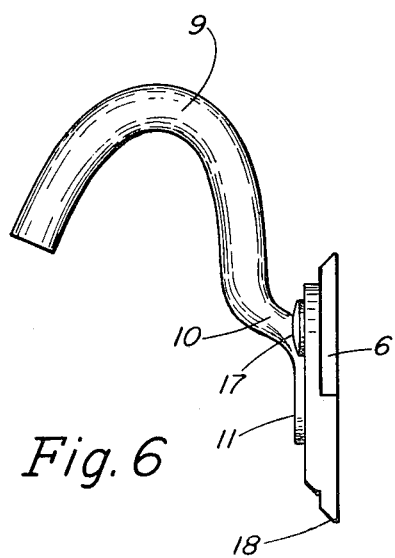
FIG. 6 is a side elevation of one hook unit, detached.

The rounded corners 12 and 13 are chamfered, as at 14, with the chamfer extending into and along the upper and lower edges 7 and 8; this to assure of matching engagement of said edges in the V-shaped grooves 5 when the attachment plate 6 is in the position of use of the hook unit. See FIG. 2.

Further, the attachment plate 6 is of a vertical dimension such that, in said position of use of the hook unit, the edges 7 and 8 wedge or "jam-engage" in the grooves; the rounded corners 12 and 13 serving to cam the plate into such position.

In order to prevent accidental displacement of the attachment plate 6 from the supporting channel 2 when the hook unit is in its position of use, said plate is fitted on its face with a swinging-type locking dog indicated generally at 15; such locking dog including an inverted L-shaped leg 16 pivoted at its upper end, as at 17, to the plate and thence depending to a lower end termination in a foot 18 having a radius chamfered, as shown, to engage in the lower groove 5. With the plate 6 in said position of use of the hook unit, the locking dog 15 is manually swung inwardly until the foot 18 engages in wedging relation in the lower groove 5; this occurring prior to the leg 16 passing dead-center relative to pivot 17. The locking dog 15, while readily manually disengageable, thus precludes rotation of plate 6 in a clockwise direction and so that the hook unit cannot accidentally escape from the supporting channel 2.

The attachment plate 6 is of a dimension between its side edges 19 somewhat less than the vertical distance between the lips 4 of the supporting channel 2, and this differential in dimensions permits said plate 6—and the hook unit 3 as a whole—to be manually quick-detached from the channel in the following manner:

After manually releasing the locking dog 15 by swinging it upwardly out of the lower groove 5, the hook 9 is grasped and twisted in a direction to part-circle rotate attachment plate 6 in a clockwise direction and until such plate is in a position with the side edges 19 at an angle of substantially 45° from vertical. In this position, the plate 6 can be withdrawn from the channel 2, passing freely between the lips 4. This wholly detaches the hook unit 3 from channel 2. In this way a number of the hook units can be readily and easily removed from channel 2 when no longer needed for use and then elsewhere stored in the truck.

As each hook unit 3 is again needed for use, it is returned to the supporting channel 2 and replaced thereon in a reversal, as is apparent, of the detachment procedure hereinbefore described. Essentially, the replacement of each hook unit is accomplished by inserting the attachment plate 6 in the channel 2 with said plate in a position to pass between the lips 4, and then rotating the plate counterclockwise until—by the camming action of rounded corners 12—it wedgingly engages in grooves 5 with the hook opening downwardly for use. Lastly, the locking dog 15 is re-engaged.

At such times that each channel 2 is empty (i.e., has no hook units therein), an ornamental strip (not shown) may be inserted in the channel in order to enhance the appearance of the truck; the strip, inserted from the end of the channel, edge-engaging in grooves 5.

From the foregoing description, it will be readily seen that there has been produced such a hook unit for pickup trucks as substantially fulfills the objects of the invention, as set forth herein.

While this specification sets forth in detail the present and preferred construction of the hook unit for pickup trucks, still in practice such deviations from such detail may be resorted to as do not form a departure from the spirit of the invention, as defined by the appended claims.

I claim:

1. A rope hook unit, for a pickup truck or the like, comprising, in combination with a horizontal, outwardly opening, supporting channel secured on the truck and formed with vertically spaced, longitudinal lips which define facing grooves, an attachment plate disposed in the channel, a hook on the attachment plate extending outwardly therefrom between the lips, the attachment plate having opposite edge portions releasably wedged in corresponding grooves and securing said plate in the channel when the hook is in position for use, said attachment plate being so formed and dimensioned that upon part-circle rotation thereof in a predetermined direction only, said edge portions escape the grooves and the plate is then removable from the channel between the lips, and a locking element mounted on said plate, said locking element being manually releasably wedged in one of said grooves for preventing such part-circle rotation of the attachment plate in said predetermined direction.

2. A rope hook unit, as in claim 1, in which the plate-mounted locking element is a locking dog swingably pivoted at one end on the attachment plate and thence extending to an opposite and free end wedged in said one groove.

3. A rope hook unit, as in claim 2, in which the locking dog is of inverted L-shape, with one leg thereof extending toward and pivoted at its outer end in connection with the attachment plate, and with the other leg projecting toward and wedged at its outer end in said one groove.

4. A rope hook unit, as in claim 3, including a foot on the outer end of said other leg of the inverted L-shaped locking dog; such foot having a radius wedged in said one groove at a point short of dead-center relative to the pivotal axis of the locking dog.

* * * * *